United States Patent
Corbin et al.

(10) Patent No.: US 9,509,163 B2
(45) Date of Patent: Nov. 29, 2016

(54) POWER CONTROL CIRCUIT ASSEMBLY FOR AN ELECTRIC DOOR LATCH MECHANISM

(71) Applicant: Hanchett Entry Systems, Inc., Phoenix, AZ (US)

(72) Inventors: David Corbin, Phoenix, AZ (US); Scott Sullivan, Cave Creek, AZ (US); Randall Shaffer, Phoenix, AZ (US); Brett L. Davis, Gilbert, AZ (US); Scott B. Lowder, Orange, CT (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 0 days.

(21) Appl. No.: 14/841,869

(22) Filed: Sep. 1, 2015

(65) Prior Publication Data
US 2016/0060902 A1    Mar. 3, 2016

Related U.S. Application Data

(60) Provisional application No. 62/044,780, filed on Sep. 2, 2014.

(51) Int. Cl.
G08B 21/00 (2006.01)
H02J 7/00 (2006.01)
H02J 1/10 (2006.01)

(52) U.S. Cl.
CPC . *H02J 7/007* (2013.01); *H02J 1/10* (2013.01)

(58) Field of Classification Search
CPC .................. E05B 47/0001; E05B 2047/0097; H02J 7/0068
USPC ............. 340/636.1, 528, 542, 636.19; 70/91, 70/277; 292/144
See application file for complete search history.

(56) References Cited

U.S. PATENT DOCUMENTS

| | | | |
|---|---|---|---|
| 4,843,851 A | * | 7/1989 | Frolov ................ E05B 47/0673 70/150 |
| 5,531,086 A | | 7/1996 | Bryant |

(Continued)

FOREIGN PATENT DOCUMENTS

| | | |
|---|---|---|
| CN | 102979379 A | 3/2013 |
| JP | 2003184369 A | 7/2003 |

(Continued)

OTHER PUBLICATIONS

Munns, Ben, "Combined Examination and Search Report Under Sections 17 and 18(3)," mailed Mar. 11, 2016 for United Kingdom Application No. GB1515560.9, United Kingdom Intellectual Property Office, South Wales.

*Primary Examiner* — Phung Nguyen
(74) *Attorney, Agent, or Firm* — Woods Oviatt Gilman LLP; Ronald J. Kisicki, Esq.

(57) ABSTRACT

A power control circuit assembly for an electric door latch mechanism comprises a load control circuit module configured to distribute a DC operating voltage to power an electromechanical door latch mechanism and its associated access control device. An energy storage device such as a rechargeable battery is coupled to the load control circuit module and is configured to deliver a DC voltage to the load control circuit module wherein the DC energy storage device voltage supplies the DC operating voltage. A rectifier is configured to receive an input AC voltage and convert the input AC voltage to an input DC voltage. The input DC voltage is adapted to deliver an energy storage device recharge voltage. An energy storage device voltage detection module is configured to interrogate a DC voltage supplied by the energy storage device.

28 Claims, 4 Drawing Sheets

(56) References Cited

U.S. PATENT DOCUMENTS

| | | | | |
|---|---|---|---|---|
| 6,076,385 A | * | 6/2000 | Pedroso | E05B 47/0012 292/144 |
| 7,346,331 B2 | * | 3/2008 | Taylor | G07C 9/00103 340/5.1 |
| 8,683,833 B2 | * | 4/2014 | Marschalek | E05B 9/08 70/149 |
| 2004/0068935 A1 | * | 4/2004 | Ichikawa | E05B 85/01 49/25 |

FOREIGN PATENT DOCUMENTS

| | | |
|---|---|---|
| JP | 2009185581 A | 8/2009 |
| WO | WO 90/06024 A | 5/1990 |
| WO | PCT/US2013/054352 A1 | 2/2014 |

\* cited by examiner

POWER CONTROL CIRCUIT ASSEMBLY FOR AN ELECTRIC DOOR LATCH MECHANISM

This Application claims the benefit of U.S. Provisional Application No. 62/044,780, filed Sep. 2, 2014.

TECHNICAL FIELD

The present invention relates to a power control circuit assembly for use with an electric door latch mechanism. More specifically, the invention relates to an improved power control circuit assembly affording improved power efficiencies when powering the electric door latch mechanism. Still more specifically, the invention relates to an improved power control circuit assembly having an energy storage device such as a rechargeable battery which powers the door latch mechanism with minimal use of grid power.

BACKGROUND OF THE INVENTION

In the prior art, solenoids are generally used as the driver to lock or unlock electromechanical door latches or strikes. The solenoid is spring biased to either a default locked or unlocked state, depending on the intended application of the lock. When power is applied to the solenoid, the solenoid is powered away from the default state to bias a return spring. The solenoid will maintain the bias as long as power is supplied to the solenoid. Once power has been intentionally removed, or otherwise, such as through a power outage from the grid or as a result of a fire, the solenoid returns to its default locked or unlocked state.

In a fail-safe lock system, power is supplied to the solenoid to lock the door latch mechanism. With power removed, a return spring moves the latching mechanism to an unlocked state. Thus, as long as the latch remains locked, power has to be supplied to the solenoid to maintain stored energy in the return spring. Typically, this power requirement equates to about 0.5 A to hold the solenoid plunger in the latch-locked state. This hold power is in addition to the approximately 1.0 A needed to initially pull in the plunger upon energizing of the solenoid.

In a fail-secure system, the reverse is true. With power removed, the return spring moves the latching mechanism to a locked state. Thus, as long as the latch remains unlocked, power has to be supplied to the solenoid to maintain stored energy in the return spring. Again, about 0.5 A is required to hold the solenoid plunger in the latch-locked state (with about a required 1 A to initially pull in the plunger).

A system designed to overcome the shortcomings of solenoid lock systems is disclosed in the prior art disclosure of Sargent Manufacturing Company (WO2014/028332—herein referred to as "the '332 publication"), the entirety of which is incorporated herein by reference. As disclosed in the '332 publication, the solenoid used to drive the door latch mechanism is swapped out for a small DC motor that moves a latching plate. This change, in combination with the motor aligning with and engaging an auger/spring arrangement, reduced standby power consumption of the driver from about 0.5 A to about 15 mA.

Nonetheless, there still exists a need for a compact power control circuit assembly, offering further improved power efficiency for use with electric door lock systems. The present invention fills these and other needs.

SUMMARY OF THE INVENTION

The present invention has found that the improved system efficiencies may be generated by coupling a small DC motor to a system that utilizes a rechargeable energy storage device such as a battery to power the system most of the time while using grid AC only to charge the energy storage device, as needed, and to power the system when the energy storage device fails. The grid AC may also provide a small amount of background power to maintain a microprocessor (and to provide for fire alarm and access control input monitoring). While the present invention is directed toward a system which utilizes a small DC motor to drive a door latch mechanism, it should be understood by those skilled in the art that the present invention may also be adapted to a solenoid driver which would also exhibit measurable efficiency improvements and such coupling should be considered within the scope of the present invention.

The present invention is directed to a power control circuit assembly for an electric door latch mechanism. The power control circuit assembly comprises a load control circuit module configured to distribute a DC operating voltage to power an electric door latch mechanism and its associated access control device. An energy storage device is coupled to the load control circuit module and is configured to deliver a DC voltage to the load control circuit module wherein the DC voltage of the energy storage device supplies the DC operating voltage. A rectifier is configured to receive an input AC voltage and convert the input AC voltage to an input DC voltage. The input DC voltage is adapted to deliver a recharge voltage to the energy storage device. An energy storage device voltage detection module is configured to detect when DC voltage from the energy storage device drops below a threshold value.

In a further aspect of the present invention, when the detected DC energy storage device voltage has a first magnitude, the energy storage device is operable to deliver the DC voltage from the energy storage device to the load control circuit module. When the detected DC voltage from the energy storage device has a second magnitude indicative of a failure of the energy storage device, the input DC voltage, supplied by grid AC, supplies the DC operating voltage.

In still a further aspect of the present invention, the power control circuit assembly includes a printed circuit board (PCB), wherein the load control circuit module, the rectifier, the load detection module and the in-line controller are printed into or mounted onto the PCB.

In a further aspect of the present invention, the power control circuit assembly is configured to reside within a double gang electrical box.

In yet a further aspect of the present invention, the electric door latch mechanism includes a DC motor or a solenoid powered by the DC operating voltage.

In still a further aspect of the present invention, the power control circuit assembly includes a microprocessor configured to monitor the energy storage device recharge voltage, the DC voltage supplied by the energy storage device and the DC operating voltage to determine the condition of the energy storage device and its ability to hold a charge, and whether the DC voltage from the energy storage device is supplying the DC operating voltage. The microprocessor initiates a visual and/or auditory alert when the energy storage device is unable to provide or sustain a satisfactory voltage level to the load control circuit, indicating that input DC voltage is instead supplying the DC operating voltage.

In a further aspect of the present invention, the power control circuit assembly includes a fire alarm interface in communication with the microprocessor wherein the electric door latch mechanism is positioned in an unlocked state when the fire alarm interface is triggered. The power control circuit assembly may further include a fire alarm interface latch wherein the electric door latch mechanism is held in the unlocked state after the fire alarm interface has been triggered until the fire alarm interface latch has been manually disabled.

In a further aspect of the present invention, the power control circuit assembly comprises one or more switches in communication with the microprocessor. The one or more switches are operable to select a respective normally open (NO) or normally closed (NC) access control device input configuration; a NO or NC fire alarm interface input configuration; a fail-safe or fail secure door latch configuration; or a disabled or enabled fire alarm interface latch configuration. Each of the one or more switches may be a dipswitch or a jumper.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

In describing the preferred embodiment of the present invention, reference will be made herein to FIGS. 1-6 of the drawings in which like numerals refer to like features of the invention. The term "electric door latch mechanism" as used herein means any electrically actuated door or gate locking device including but not limited to an electric strike, an electric latch or an electromagnetic lock.

Figure 1:
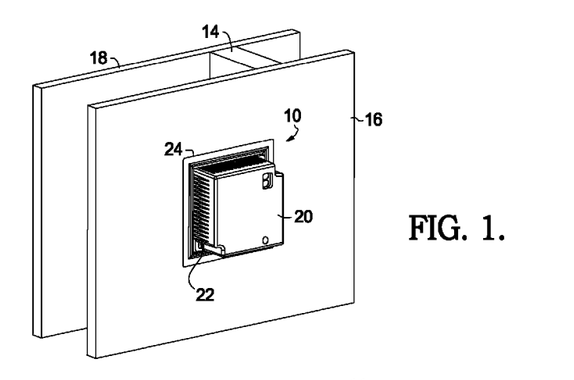
FIG. 1 is a perspective environmental view of a power control circuit assembly for an electric door lock in accordance with an aspect of the present invention.
Figure 2:
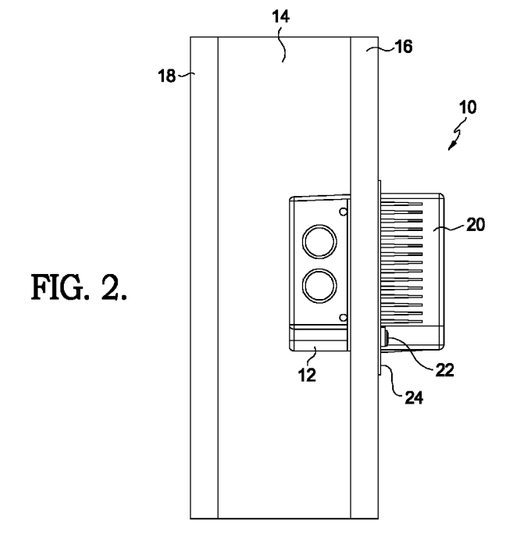
FIG. 2 is a side environmental view of the power control circuit assembly seen in FIG. 1.
Figure 3:
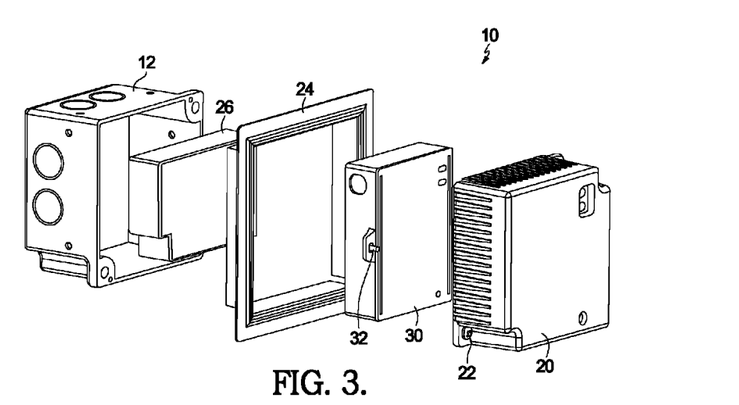
FIG. 3 is an exploded view of the power control circuit assembly seen in FIGS. 1 and 2.

Referring to FIGS. 1-3, a power control circuit assembly in accordance with an embodiment of the present invention is generally indicated by reference numeral 10. Unlike a comparatively large power control box typically located above ceiling panels, as known in the prior art, power control circuit assembly 10 is configured to reside within a standard-in-the-industry double gang electrical box 12 that is sized to host two electrical components (such as a standard electrical switch or receptacle), made possible by the compact design of the load control circuitry module and rechargeable energy storage device. Box 12 may be secured to an interior framing member 14 between opposing panels of drywall 16, 18, and conveniently disposed adjacent a door assembly and latching mechanism instead of in a remote location such as above ceiling panels as known in the prior art. An assembly cap 20 is secured to box 12 by a pair of cap screws 22. To improve aesthetics of the installed assembly, box 12 may include a cover plate 24 configured to overlap any gaps between the edge of the hole cut in drywall panel 16 and the outer surface of box 12. A rechargeable energy storage device 26, such as for example a rechargeable battery, is housed within electrical box 12 while a printed circuit board (PCB) 28 and associated components (see FIG. 4) is housed within a case 30 which is secured within box 12 and assembly cap 20 via case screws 32.

Figure 4:
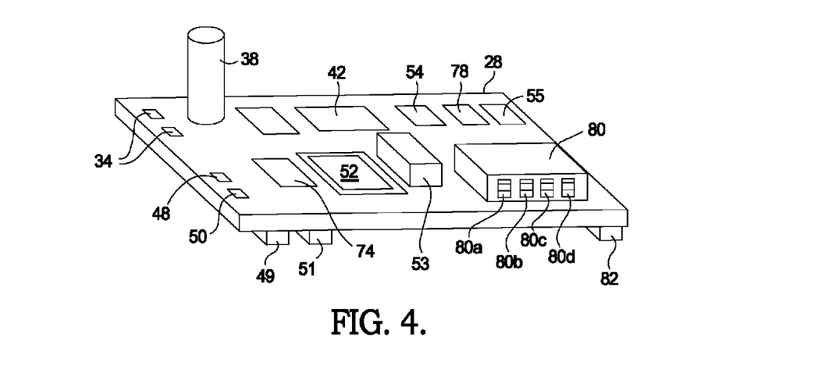
FIG. 4 is a schematic view of a printed circuit board used with the power control circuit assembly seen in FIGS. 1-3.
Figure 5:
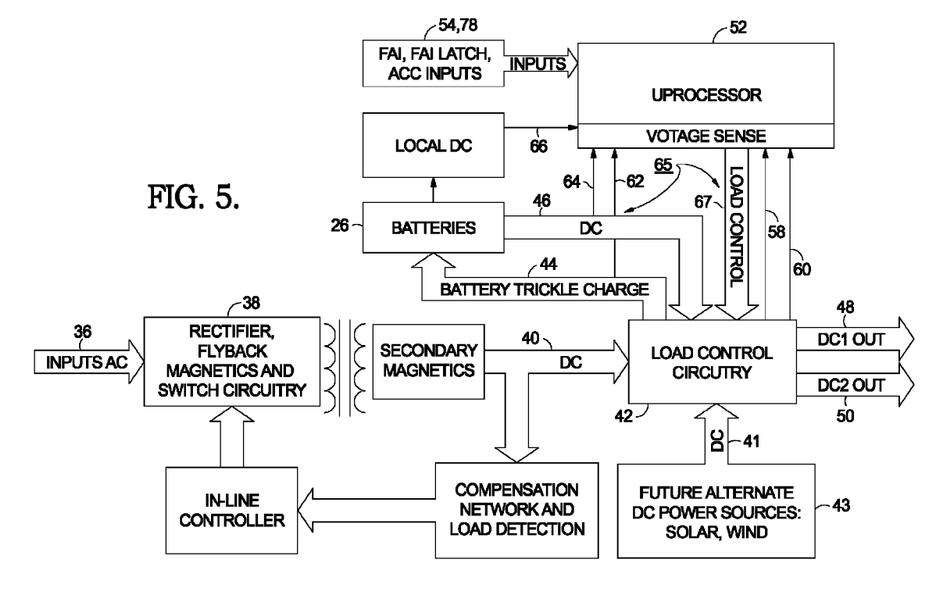
FIG. 5 is a schematic of an exemplary power control pathway of the power control circuit assembly seen in FIGS. 1-3.

As seen in FIG. 4, and with additional reference to FIG. 5, PCB 28 includes AC inputs 34 configured to receive grid input AC voltage 36. Grid input AC voltage 36 is converted by rectifier 38 to input DC voltage 40. As an aside, it should be noted that an alternative input DC voltage 41 may be provided using alternative energy sources 43, such as solar or wind energy. Input DC voltage 40 is routed through load control circuit module 42 to supply a charge voltage 44 to energy storage device 26. Energy storage device 26 then routes a DC voltage 46 to load control circuit module 42 where it is conditioned by load control circuit module 42 to be output as one or more DC operating voltages, such as DC output voltages 48, 50. By way of example, DC output voltage 48 may be used to power an access control device (not shown), such as but not limited to a card reader, keypad or biometric sensor, while DC output voltage 50 may power an electric door latch mechanism (not shown), such as that described within the '332 publication discussed above.

Distribution of DC output voltage 48, 50 may be directed by a microprocessor (MP) 52 powered via a microprocessor voltage 66 supplied by energy storage device 26 at terminal 53 on PCB 28. For instance, DC output voltage 50 may be directed to the electric door latch mechanism after MP 52 receives an authorized control signal entered via the access control device and transmitted to MP 52 via access control input 54. MP 52 may also provide supervisory pathways 58, 60 which monitor DC output voltages 48, 50 to ensure that load control circuit module 42 is operating properly and outputting the requisite DC output voltage 48, 50. The status of DC output voltages 48, 50 may be indicated visually such as through LED's 49, 51, respectively. MP 52 may also monitor energy storage device operation via supervisory pathways 62, 64. Pathway 62 interrogates the magnitude of energy storage device charge voltage 44 directed from load control circuit module 42 to energy storage device 26 while pathway 64 monitors the DC voltage being supplied by energy storage device 26 to load control circuit module 42. Should the energy storage device need frequent recharging or should the energy storage device fail to provide the requisite DC voltage, MP 52 will issue an alert indicating a need for replacement of the rechargeable energy storage device. The alert may be a visual alert (such as the powering of an LED) and/or may be an audible alert (such as the powering of a buzzer 55 to emit a chirp or other noise).

In the event of a failure of the rechargeable energy storage device (i.e., MP 52 determines through measurements received via supervisory paths 62 and 64 that the energy storage device needs frequent recharging or the energy storage device fails to provide the requisite DC voltage), DC output voltages 48, 50 may be supplied directly via input DC voltage 40. To that end, PCB 28 includes an energy storage device voltage detection module 65 that detects whether DC voltage 46 supplied by the energy storage device drops below a threshold voltage via the supervisory paths and, when it does, sends a signal to load control circuit module 42, via line 67, to supply DC voltage 40 directly to DC output voltages 48, 50, to satisfy the increased voltage demand caused by the failed energy storage device.

It should be noted that the DC voltage supplied by the energy storage device is monitored by MP 52, even if the energy storage device is no longer operative. In this manner, once a new energy storage device has replaced a worn out one, if the replacement energy storage device's voltage level is below a threshold voltage (indicating that the replacement energy storage device itself needs recharging), the input DC voltage will continue to power DC output voltages 48, 50 until the new energy storage device has been charged and can then provide the necessary DC voltage to power the electric door lock.

PCB 28 may further include fire alarm input 78 wherein input 78 is configured to receive a fire alarm activation signal from a remote fire alarm system. In this manner, DC output voltage 50 used to power the electric door latch mechanism may be disabled during an emergency, thereby placing the door latch mechanism in a preselected and desired state.

To facilitate power control circuit assembly 10 functionality, PCB 28 may include one or more switches in communication with MP 52, such as dipswitch 80. While described as a dipswitch, switch 80 may be any suitable electrical connection, for instance, a jumper block. Dipswitch 80 may include switches controlling various functionalities, such as an access control switch 80a to selectively configure the access control input 54 as normally open (NO) or normally closed (NC); a fire alarm switch 80b to selectively configure fire alarm input 78 as NO or NC; a lock behavior switch 80c to selectively configure the electromechanical door latch mechanism to be fail secure or fail safe; and a latching switch 80d to selectively activate fire alarm latching. Fire alarm latching is required by law in certain jurisdiction, such as Canada, wherein once a fire alarm input 78 is activated by the fire alarm system and the door lock mechanisms have been placed within their unlocked default state, the fire alarm latch prevents repowering of the electromechanical door latch mechanism until the fire alarm latch is manually disabled by resetting the switch. For those jurisdictions not requiring fire alarm latching, MP 52 automatically resets the lock mechanisms once the fire alarm has been disabled.

Figure 6:
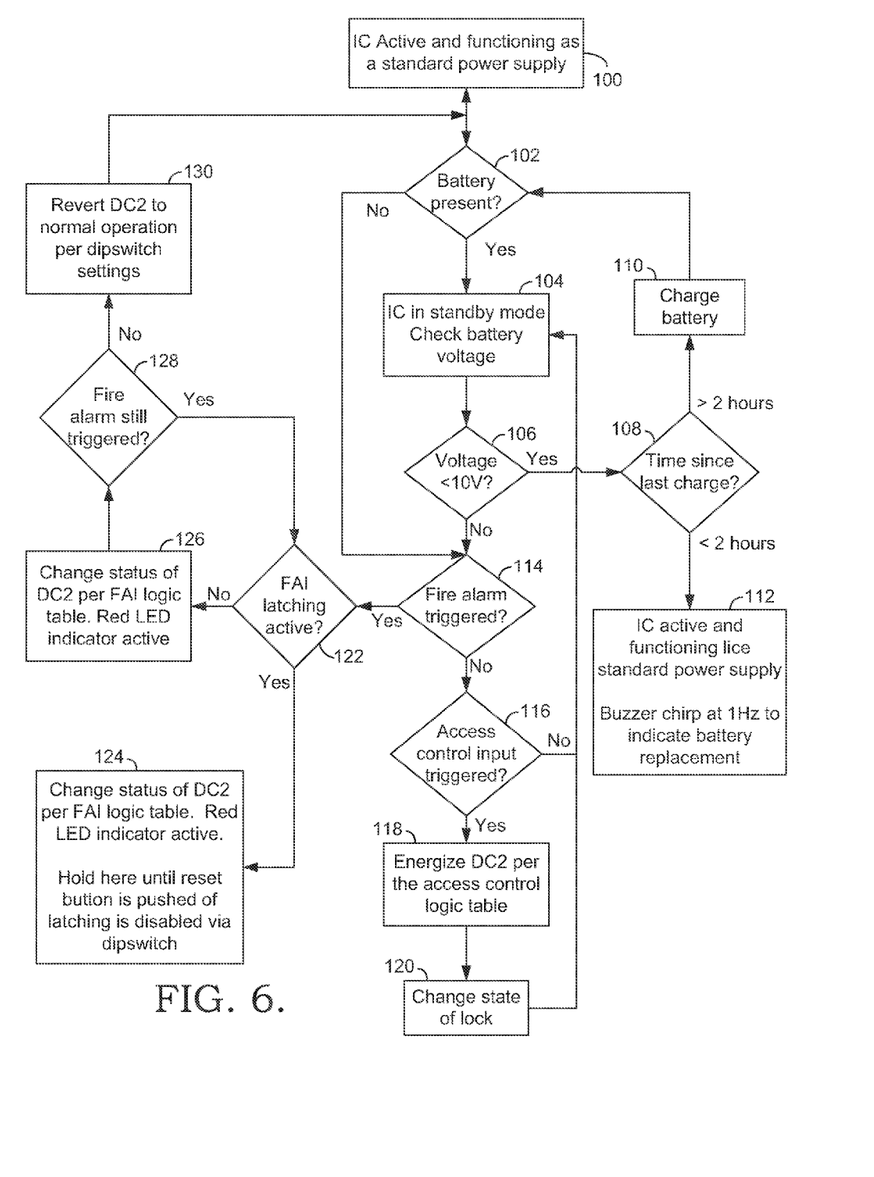
FIG. 6 is a process flow diagram operating the power control circuit assembly seen in FIGS. 1-5.

FIG. 6 shows a process flow diagram for initializing and operating power control circuit assembly 10 (see FIGS. 1-5). In a first step 100, upon initialization of the circuit, (energy storage device 26 is depleted) in-line controller 74 is active such that input DC voltage 40 is operating to power DC output voltages 48, 50. In step 102, MP 52 interrogates whether energy storage device 26 is present within circuit 10. If energy storage device 26 is present, in step 104, MP 52 places the in-line controller 74 in standby mode and interrogates energy storage device voltage to determine whether the energy storage device has at least 10 V of charge (step 106). If the energy storage device has less than 10 V of charge, MP 52 interrogates its internal memory to determine the last time energy storage device 26 was recharged with charge voltage 44 (step 108). If the last charging of energy storage device 26 occurred longer ago than a selected length of time (i.e. more than 2 hours), energy storage device 26 is charged with charge voltage 44 (step 110). However, if the last charging occurred more frequently than the selected length of time, MP 52 will interpret the instant lack of energy storage device voltage as indicative of an energy storage device failure needing replacement and will initialize an alarm signal 55 such as for example, a buzzer to emit a chirp (step 112).

Alternatively, if energy storage device 26 holds a voltage greater than 10 V (or if energy storage device 26 is not present (step 102), MP 52 determines whether fire alarm input 78 has been activated (step 114). If fire alarm input 78 has not been activated, MP 52 determines whether access control input 54 has been activated with an authorized access code (step 116). If an authorized access code has been entered (step 118), MP 52 authorizes load control circuit module 42 to supply DC output voltage 50 to the electromechanical door latch mechanism thereby changing the state of the electric door lock (step 120). If the access control input 54 has not been activated or after the state of the lock has been changed after authorization, MP 52 reverts to step 104 wherein the in-line controller is in standby mode and the charge of the energy storage device is interrogated.

If MP 52 determines that fire alarm input 78 has been activated (step 114), MP 52 will then determine, in step 122, whether active fire alarm latching has been selected (such as by way of dipswitch 80d, discussed above). If fire alarm latching is active, step 124 has MP 52 changing the status of DC output voltage 50 (i.e. placing it in the unpowered default state) and energizing LED 82 to indicate the active fire alarm input 78. DC output voltage 50 and LED 82 will remain in these conditions until dipswitch 80d is manually reset. To manually reset the fire alarm latch, cap 20 is removed to expose dipswitch 80d wherein a small tool may be used to reset the switch. Alternatively, cap 20 may be configured to include small access holes wherein a small tool may be inserted through cap 20 to access the one or more switches 80a-80d either directly or indirectly through connecting buttons 80a-80d. If fire alarm latching is inactive, MP 52 will change the status of DC output voltage 50 (i.e. place it in the unpowered default state) and energize LED 82 to indicate the active fire alarm input 78 (step 126). MP 52 will then query whether the fire alarm input is still activated (step 128), wherein if the input 78 is still active MP 52 reverts to step 122. If fire alarm input 78 is no longer active, MP 52 returns power control circuit assembly 10 to normal operation (step 130).

From the above description, it should be evident to those skilled in the art that the power control circuit assembly 10 of the present invention utilized DC voltage supplied by energy storage device 26 to power the associated electric door lock. Input AC voltage 36 is utilized only to recharge energy storage device 26 when needed or to provide DC output voltage 48, 50 should energy storage device 26 be inoperable and requiring of replacement. In this manner, energy efficiency may be maximized.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A power control circuit assembly for an electric door latch mechanism, said power control circuit assembly comprising:
   a) a load control circuit module configured to distribute a DC output voltage to power the electric door latch mechanism;
   b) an energy storage device coupled to said load control circuit module, wherein said energy storage device is configured to supply a DC voltage to said load control circuit module;

c) a rectifier configured to receive an input AC voltage and convert said input AC voltage to an input DC voltage, wherein said input DC voltage is configured to supply an energy storage device recharge voltage to said energy storage device; and d) an energy storage device voltage detection module configured to interrogate said DC voltage supplied by said energy storage device to said load control circuit module;

wherein when said interrogated DC voltage has a first magnitude, said energy storage device is operable to supply said DC voltage to said load control circuit module so that said DC voltage supplies said DC output voltage, and wherein when said interrogated DC voltage has a second magnitude indicative of a failure of said energy storage device, said input DC voltage supplies said DC output voltage.

2. The power control circuit assembly in accordance with claim 1 and further comprising:

e) a printed circuit board (PCB), wherein said load control circuit module, said rectifier and said energy storage device voltage detection module are printed into or mounted onto said PCB.

3. The power control circuit assembly in accordance with claim 1 wherein the power control circuit assembly is configured to reside within a double gang electrical box.

4. The power control circuit assembly in accordance with claim 1 wherein the electric door latch mechanism includes a DC motor or a solenoid powered by said DC output voltage.

5. The power control circuit assembly in accordance with claim 1 and further comprising:

a microprocessor coupled with said energy storage device voltage detection module, wherein said microprocessor is configured to monitor said recharge voltage, said DC voltage and said DC output voltage.

6. The power control circuit assembly in accordance with claim 5 wherein said microprocessor initiates a visual and/or auditory alert upon failure of said energy storage device.

7. The power control circuit assembly in accordance with claim 5 and further comprising:

e) a fire alarm interface in communication with said microprocessor, wherein the electric door latch mechanism is positioned in an unlocked state when said fire alarm interface is triggered.

8. The power control circuit assembly in accordance with claim 7 wherein the electric door latch mechanism is unpowered when in said unlocked state.

9. The power control circuit assembly in accordance with claim 7 and further comprising:

f) a fire alarm interface latch, wherein the electric door latch mechanism is held in said unlocked state after said fire alarm interface has been triggered until said fire alarm interface latch has been manually disabled.

10. The power control circuit assembly in accordance with claim 9 and further comprising:

g) one or more switches in communication with said microprocessor, said one or more switches operable to select a respective normally open (NO) or normally closed (NC) access control device input configuration; a NO or NC fire alarm interface input configuration; a fail-safe or fail secure door latch configuration; or a disabled or enabled fire alarm interface latch configuration.

11. The power control circuit assembly in accordance with claim 10 wherein each of said one or more switches is a dipswitch or a jumper.

12. The power control circuit assembly in accordance with claim 1 wherein the electric door latch mechanism is an electromagnetic lock.

13. The power control circuit assembly in accordance with claim 1 further including an in line controller, wherein when said interrogated DC voltage has said second magnitude indicative of said failure of said energy storage device, said in line controller is operative to supply said input DC voltage as said DC output voltage.

14. The power control circuit assembly in accordance with claim 13 and further comprising:

e) a printed circuit board (PCB), wherein said load control circuit module, said rectifier, said energy storage device voltage detection module and said in line controller are printed into or mounted onto said PCB.

15. The power control circuit assembly in accordance with claim 1 wherein said input DC voltage is used to provide an energy storage device recharge voltage to said energy storage device through said load control circuit module.

16. The power control circuit assembly in accordance with claim 1 wherein said first magnitude is greater than said second magnitude.

17. A method of operating a power control circuit for powering a door latch mechanism, wherein said power control circuit includes both a DC input power supply and a rechargeable energy storage device for powering said door latch mechanism, said method comprising the steps of:

a) determining whether a voltage supplied by said rechargeable energy storage device for powering said door latch mechanism is below a threshold voltage level;

b) determining a length of time since said rechargeable energy storage device was last recharged;

c) charging said rechargeable energy storage device if said length of time determined in step b) is at or above a preselected length of time; and d) interpreting a failure of said rechargeable energy storage device if said length of time determined in step b) is below said preselected length of time.

18. The method in accordance with claim 17 comprising the step of initializing an alarm signal if said failure is interpreted.

19. The method in accordance with claim 17 comprising the step of powering said door latch mechanism with said DC input power supply if said failure is interpreted.

20. A power control circuit assembly for an electric door latch mechanism, said power control circuit assembly comprising:

a) an input DC voltage source configured to provide an input DC voltage;

b) an energy storage device configured to provide an energy storage device DC voltage;

c) a load control circuit module configured to provide a DC output voltage to power the electric door latch mechanism; and d) a microprocessor coupled to said load control circuit module and configured to selectively direct either said input DC voltage or said energy storage device DC voltage to the electric door latch mechanism as said DC output voltage, wherein when said energy storage device DC voltage drops below a threshold voltage, said microprocessor directs said input DC voltage to said electric door latch mechanism as said DC output voltage.

21. The power control assembly in accordance with claim 20 wherein said energy storage device is a rechargeable energy storage device, and said input DC voltage delivers a charge voltage to recharge said rechargeable energy storage device.

22. The power control assembly in accordance with claim 21 further including an energy storage device voltage detection module configured for detecting whether said energy storage device DC voltage drops below said threshold voltage.

23. The power control assembly in accordance with claim 22 wherein said microprocessor is configured to determine a length of time since said rechargeable energy storage device was last recharged by said charge voltage, wherein upon determining that said length of time since said rechargeable energy storage device was recharged by said charge voltage is below a selected length of time, and said energy storage device DC voltage drops below said threshold voltage, an alarm signal by said microprocessor is initialized.

24. The power control assembly in accordance with claim 23 wherein said selected length of time is at least 2 hours.

25. The power control assembly in accordance with claim 20 wherein said threshold voltage is 10 volts.

26. The power control assembly in accordance with claim 20 wherein when said energy storage device DC voltage does not drop below said threshold voltage, said microprocessor directs said energy storage device DC voltage to said electric door latch mechanism as said DC output voltage.

27. The power control assembly in accordance with claim 26 wherein said energy storage device is a rechargeable energy storage device, wherein said input DC voltage delivers a charge voltage to recharge said rechargeable energy storage device, wherein said microprocessor is configured to determine if a last time said rechargeable energy storage device was recharged by said charge voltage exceeds a selected length of time, wherein said microprocessor directs only said input DC voltage to said electric door latch mechanism as said DC output voltage when said microprocessor determines that said last time said rechargeable energy storage device was recharged by said charge voltage does not exceed said selected length of time, and said energy storage device DC voltage drops below said threshold voltage.

28. The power control assembly in accordance with claim 20 further including:
   a fire alarm switch having a latching active position and a latching inactive position;
   a manually resettable latching switch; and
   a fire alarm input configured for receiving a signal from a fire alarm system in the event of a fire,
   wherein, upon receipt of said signal and when said fire alarm switch is in said latching active position, said microprocessor unpowers said DC output voltage to said electric door latch mechanism until said manually resettable latching switch is reset.

* * * * *